United States Patent
McQuillen et al.

(10) Patent No.: US 10,018,156 B1
(45) Date of Patent: Jul. 10, 2018

(54) METHOD AND SYSTEM FOR ENGINE WATER INJECTION

(71) Applicant: Ford Global Technologies, LLC, Dearborn, MI (US)

(72) Inventors: Michael McQuillen, Warren, MI (US); Daniel A. Makled, Dearborn, MI (US); Mohannad Hakeem, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/384,150

(22) Filed: Dec. 19, 2016

(51) Int. Cl.
*F02B 47/02* (2006.01)
*F02M 25/022* (2006.01)
*F02M 25/028* (2006.01)

(52) U.S. Cl.
CPC ...... *F02M 25/0227* (2013.01); *F02M 25/028* (2013.01); *F02M 25/0222* (2013.01)

(58) Field of Classification Search
CPC .. F02D 19/12; F02D 41/0025; F02D 41/1456; F02D 41/402; F02B 47/02; Y02T 10/121; Y02T 10/36; F02M 25/022
USPC ............................................. 123/25 A–25 N
See application file for complete search history.

(56) References Cited

U.S. PATENT DOCUMENTS

| | | |
|---|---|---|
| 4,571,151 A | 2/1986 | Paul |
| 6,026,641 A | 2/2000 | Liberty |
| 8,522,760 B2 | 9/2013 | Soltis |
| 8,763,594 B2 | 7/2014 | Sumilla et al. |
| 9,169,755 B2 | 10/2015 | Ulrey et al. |
| 9,291,125 B2 | 3/2016 | Yoshihara et al. |
| 9,309,838 B2 | 4/2016 | Surnilla et al. |
| 9,416,740 B2 | 8/2016 | Styles et al. |
| 2010/0121559 A1 | 5/2010 | Bromberg et al. |
| 2011/0174267 A1 | 7/2011 | Surnilla et al. |
| 2013/0206100 A1 | 8/2013 | Yacoub |
| 2013/0218438 A1 | 8/2013 | Surnilla et al. |
| 2014/0366508 A1 | 12/2014 | Ulrey et al. |
| 2015/0047339 A1 | 2/2015 | Rollinger et al. |

(Continued)

FOREIGN PATENT DOCUMENTS

| | | | |
|---|---|---|---|
| EP | 2607647 A1 | 6/2013 | |
| JP | 60162116 A | * 8/1985 | ............. F23L 7/002 |

OTHER PUBLICATIONS

McQuillen, Michael, et al., "Method and System for Pulsed Engine Water Injection," U.S. Appl. No. 15/384,172, filed Dec. 19, 2016, 49 pages.

(Continued)

*Primary Examiner* — Marguerite McMahon
*Assistant Examiner* — Tea Holbrook
(74) *Attorney, Agent, or Firm* — Julia Voutyras; McCoy Russell LLP

(57) ABSTRACT

Methods and systems are provided for assessing the quality of water in a water injection system using existing engine sensors. A change in manifold charge temperature following a water injection may be compared to a change in intake oxygen level to determine an error between an amount of water delivered to the engine and an amount of water actually used in the engine. The error may be correlated with the water quality and used for correcting subsequent water injection commands.

20 Claims, 3 Drawing Sheets

(56) References Cited

U.S. PATENT DOCUMENTS

2015/0076134 A1    3/2015    Surnilla et al.
2015/0114346 A1    4/2015    Surnilla et al.

OTHER PUBLICATIONS

McQuillen, Michael, et al., "Method and System for Engine Water Injection," U.S. Appl. No. 15/384,188, filed Dec. 19, 2016, 50 pages.

McQuillen, Michael, et al., "Method and System for Adjusting Engine Water Injection," U.S. Appl. No. 15/384,204, filed Dec. 19, 2016, 75 pages.

McQuillen, Michael, et al., "Method and System for Adjusting Engine Water Injection," U.S. Appl. No. 15/384,223, filed Dec. 19, 2016, 77 pages.

Shelby, Michael Howard, et al., "Method and System for Engine Water Injection," U.S. Appl. No. 15/384,243, filed Dec. 19, 2016, 55 pages.

Hakeem, Mohannad, et al., "Method and System for Water Injection Control," U.S. Appl. No. 15/384,253, filed Dec. 19, 2016, 45 pages.

\* cited by examiner

METHOD AND SYSTEM FOR ENGINE WATER INJECTION

FIELD

The present description relates generally to methods and systems for assessing the quality of water injected into an engine.

BACKGROUND/SUMMARY

Internal combustion engines may include water injection systems that inject water into a plurality of locations, such as into an intake manifold, upstream of engine cylinders, or directly into engine cylinders. Engine water injection provides various benefits such as an increase in fuel economy and engine performance, as well as a decrease in engine emissions. In particular, when water is injected into the engine intake or cylinders, heat is transferred from the intake air and/or engine components to the water, leading to charge cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, improved wide-open throttle performance, and decreased exhaust temperature. As a result, fuel efficiency is increased. Additionally, greater volumetric efficiency may lead to increased torque. Furthermore, lowered combustion temperature with water injection may reduce NOx emissions, while a more efficient fuel mixture (reduced enrichment) may reduce carbon monoxide and hydrocarbon emissions.

Water injection systems include a water reservoir which may be refilled manually as well as opportunistically via water generated on-board the vehicle. For example, water in the form of condensate may be retrieved from one or more components, such as an EGR cooler, an AC evaporator, an exhaust heat exchanger, a charge air cooler, a vehicle external surface, etc. However, based on the source of the water, the quality of water injected into the engine may vary. In particular, the nature of contaminants present in the water, as well as the degree of contamination, may vary widely based on where the vehicle operator refilled the water tank from. For example, it may be recommended to refill the water tank with distilled water, but the operator may refill with tap water or well water instead. This variation can result in minerals getting deposited on water filters, water injectors, engine parts, exhaust catalysts, etc., affecting engine performance as well as potentially damaging engine hardware.

Various approaches have been developed to test the quality of water available on-board a vehicle water injection system. For example, a variety of dedicated water quality sensors may be provided, such as conductivity sensors, turbidity sensors, pH sensors, etc. However, the addition of dedicated sensors for water quality assessment may add to engine costs. Further, engine controls may need to be modified to periodically diagnose the sensors. Furthermore, a variety of sensors may be required to accurately assess the water quality since the nature of contaminants present in the water may vary widely. Reliance on a single type of sensor to determine if the available water is of poor quality may be error prone.

In one example, some of the above issues may be at least partly addressed by a method for an engine in a vehicle, comprising: injecting an amount of water from a water reservoir into an engine; comparing a first estimate of the water injection amount based on a change in manifold charge temperature to a second estimate of the water injection amount based on a change in intake oxygen level; and adjusting a subsequent water injection to the engine based on the comparing. In this way, the quality of the injected water may be assessed and water injection may be adjusted in accordance.

As an example, an engine may be configured with a water injection system that enables water to be injected into one or more engine locations, such as into an intake manifold. The water injection system may include a water injector as well as a water reservoir supplying water to the injector. The water reservoir may be manually refilled by a vehicle operator. Additionally, the water reservoir may be coupled to a water collection system that opportunistically refills the reservoir with water generated on-board the vehicle. For example, water in the form of condensate may be retrieved from one or more engine components, such as an EGR cooler, an AC evaporator, an exhaust heat exchanger, a charge air cooler, a vehicle external surface, etc. Based on engine operating conditions, an amount of water may be delivered into the engine intake manifold. A controller may infer an actual amount of water delivered into the engine based on a change in manifold charge temperature (MCT) following the injecting. In addition, the controller may infer the actual amount of water dispersed into the engine (that is, the portion of the injection that provides the actual charge cooling effect) based on a change in intake dilution level (or intake oxygen level). As such, a discrepancy between the amount of water injected and the amount of water dispersed (or vaporized) may be due to the quality of the water. In particular, as the quality of water decreases, a smaller portion of the injected water may vaporize. Consequently, the contaminants may reduce the effectiveness of the water injection. As one example, as the salt or ion content of the water increases, the boiling temperature of the water solution may rise, resulting in a smaller portion of water evaporating and dispersing into the intake aircharge at a given aircharge temperature. Thus, the controller may correlate water quality with a water injection error learned based on a difference between the change in MCT relative to the change in intake oxygen level following the water injection. During a subsequent water injection event, the commanded injection amount may be adjusted with a correction factor that compensates for the learned water injection error. In addition, if the water quality is deemed poor (such as when the water quality is lower than a threshold), water usage may be adjusted, such as by increasing water usage in a defined operating window so as to expedite water refilling.

In this way, a water quality can be reliably assessed using existing sensors. The technical effect of learning a water injection error based on distinct sets of engine operating parameters at the same engine operating condition, following a given water injection, is that even small differences between the water that is injected and the water that has vaporized can be reliably measured using sensors already present in the system. As a result, the water injection error may be robustly determined without reliance on expensive and dedicated water quality sensors, and water injection can be adjusted accordingly. In addition, by correlating the errors in water injection amount a water quality, the water quality may be reliably assessed, reducing system damage from contaminated water. Further, by adjusting water usage based on assessed water quality, parasitic losses and financial costs of purifying the water are minimized. The technical effect of integrating the water injection system with a control system that protects against contaminated water usage is that continued refilling of a water reservoir with contaminated water is reduced, extending engine component life. By improving water usage, the benefits of water injection can be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for improving the usage of water from a water injection system coupled to a vehicle engine, as described with reference to the vehicle system of FIG. 1. A controller may be configured to perform a control routine, such as the example routine of FIG. 2, to assess the quality of water available in a water reservoir based on a learned water injection error. Further, based on the learned water quality, subsequent water usage may be adjusted. An example water quality learning and water injection adjustment is described with reference to FIG. 3. In this way, water usage may be improved to enable significant fuel economy improvements to the vehicle's performance.

Figure 1:
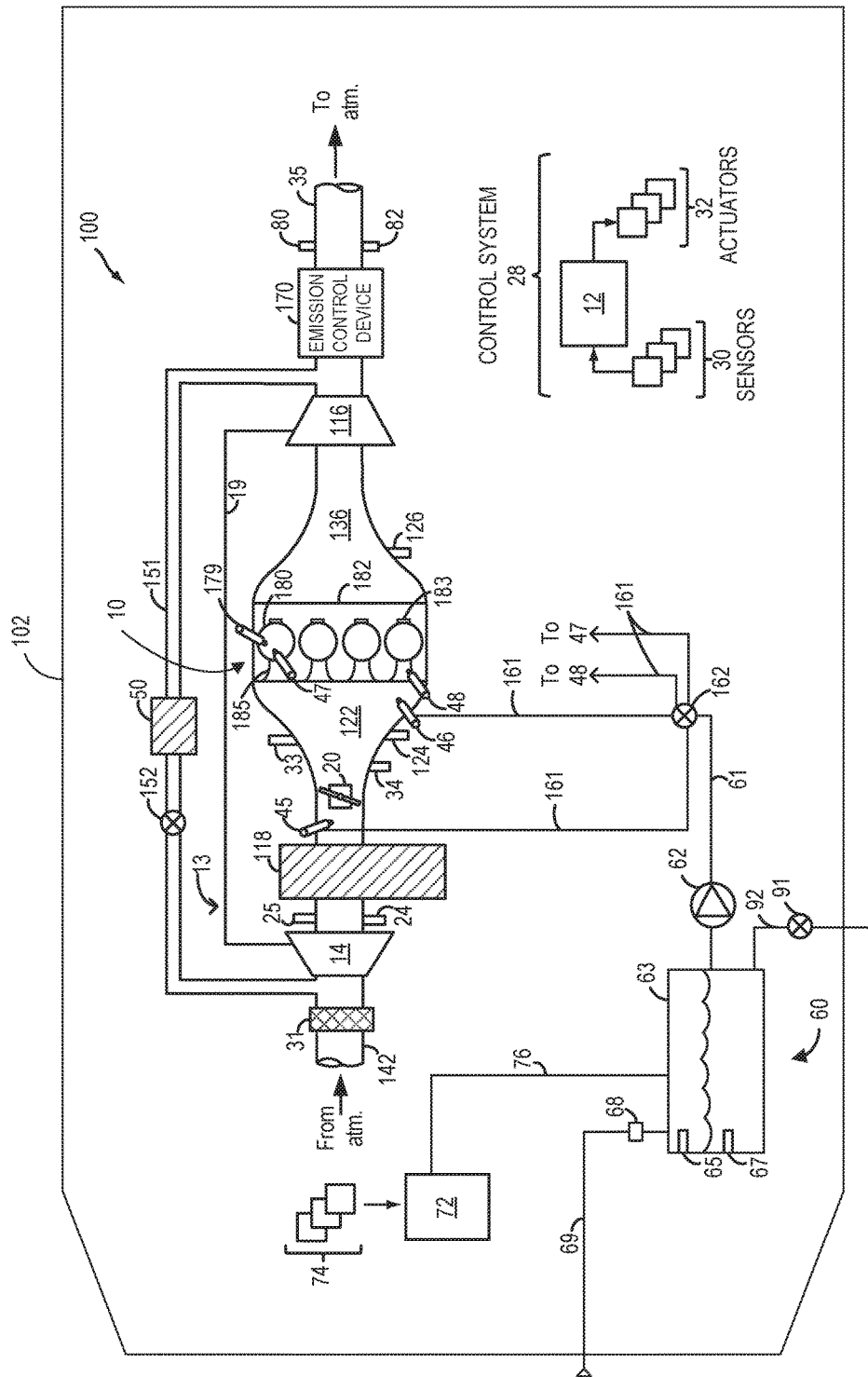
FIG. 1 shows a schematic diagram of an engine system including a water injection system.

FIG. 1 shows an example embodiment of an engine system 100 configured with a water injection system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 33 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example.

As elaborated herein, following injection of water into the intake manifold, an output of MCT sensor 33 may be monitored. Since the release of water into the intake manifold causes charge cooling, an amount of water actually released or delivered into the engine intake manifold may be learned as a function of the change in MCT following the commanding of a water injection. As such, the amount of water released may be different from the amount of water that is dispersed or vaporized in the engine. The amount of water vaporized may be determined based on the output of an intake oxygen sensor 34 coupled to the engine intake manifold, downstream of the intake throttle. As elaborated herein, by comparing the change in MCT to the change in intake oxygen (or intake humidity) following the water injection, a water injection error may be learned and a quality of the water injected into the engine may be assessed.

Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 33 may be positioned to determine the manifold charge temperature, wherein the charge may include air and exhaust recirculated through the EGR passage 151.

Intake manifold 122 may further include an intake gas oxygen sensor 34. In one example, the oxygen sensor is a UEGO sensor. The intake gas oxygen sensor may be configured to provide an estimate regarding the oxygen content of fresh air received in the intake manifold. In addition, when EGR is flowing, a change in oxygen concentration at the sensor may be used to infer an EGR amount and used for accurate EGR flow control. In the depicted example, oxygen sensor 34 is positioned downstream of throttle 20 and downstream of charge air cooler 118. However, in alternate embodiments, the oxygen sensor may be positioned upstream of the throttle. Intake oxygen sensor 34 may be used for estimating an intake oxygen concentration and inferring an amount of EGR flow through the engine based on a change in the intake oxygen concentration upon opening of the EGR valve 152. Specifically, a change in the output of the sensor upon opening the EGR valve is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

It will be appreciated that the intake oxygen sensor 34 may be operated in various modes based on the engine operating conditions and further based on the nature of the estimation being performed by the sensor. For example, as discussed above, during engine fueling conditions when dilution/EGR estimation is required, the intake oxygen sensor may be operated in a nominal mode with a (fixed) reference voltage applied to the sensor, the reference voltage maintained during the sensing. In one example, the reference voltage may be 450 mV. During other conditions, such as during engine non-fueling conditions (e.g., during a DFSO), when ambient humidity (in the intake aircharge) estimation is required, the intake oxygen sensor may be operated in a variable voltage mode with the reference voltage applied to the sensor modulated. In still another example, the sensor may be operated in the variable voltage mode when EGR estimation is performed while fuel vapor purge (from a fuel system canister) or positive crankcase ventilation (of the engine crankcase) is enabled. Therein, the reference voltage of oxygen sensor is modulated to reduce the hydrocarbon effect of the purge on the intake oxygen sensor. In one example, the reference voltage may be modulated between the nominal reference voltage of 450 mV and a higher reference voltage of 800 mV (or 950 mV). By changing the intake oxygen sensor's reference voltage, or Nernst voltage, the sensor goes from reacting hydrocarbons with ambient oxygen at the sensor to dissociating the products of the reaction (water and carbon dioxide). In addition, the reference voltage may be modulated between the higher voltage and the lower voltage, in the presence and absence of HCs from purge and PCV air, to estimate a purge and PCV content in the intake aircharge. As elaborated herein, an amount of water vaporized in the engine following water injection may be determined based on the output of intake oxygen sensor 34. Further, the estimated amount of water vaporized may vary based on the mode of operation of the oxygen sensor.

In particular, the amount of water measured by the oxygen sensor varies with the operating reference voltages. These changes are quantified by characterizing the sensor at varied operating conditions with varied amounts of vaporized water. Through this characterization, the estimation of the amount of water vaporized can be corrected across the range of operating reference voltages. The sensor's reference voltage is changed to measure the concentration of water which is then compared against the expected concentration of water to determine the water quality. A specific reference voltage could be selected for the water quality assessment which is different from the reference voltage selected for air-fuel ratio or dilution estimation. Based on the characterization described above, any error caused by the selected reference voltage may be learned and corrected for.

Combustion chamber 180 also receives water and/or water vapor via water injection system 60. Water from water injection system 60 may be injected into the engine intake or directly into the combustion chambers 180 by one or more of water injectors 45-48. As one example, water may be injected into intake manifold 122, upstream of throttle 20, via water injector 45, herein also referred to as central water injection. As another example, water may be injected into intake manifold 122, downstream of the throttle in one or more locations, via water injector 46. As yet another example, water may be injected into one or more intake runners (e.g., intake ports) 185 via water injector 48 (herein also referred to as port water injection), and/or directly into combustion chamber 180 via water injector 47 (herein also referred to as direct water injection). In one embodiment, injector 48 arranged in the intake runners may be angled toward and facing the intake valve of the cylinder which the intake runner is attached to. As a result, injector 48 may inject water directly onto the intake valve, resulting in faster evaporation of the injected water and a higher dilution benefit from the water vapor. In another embodiment, injector 48 may be angled away from the intake valve and arranged to inject water against the intake air flow direction through the intake runner. As a result, more of the injected water may be entrained into the air stream, thereby increasing the charge cooling benefit of the water injection.

Though only one representative injector 47 and injector 48 are shown in FIG. 1, each of combustion chamber 180 and intake runner 185 may include its own injector. In alternate embodiments, water injection system 60 may include water injectors positioned at one or more of these positions. For example, the engine may include only water injector 46, in one embodiment. In another embodiment, the engine may include each of water injector 46, water injectors 48 (one at each intake runner), and water injectors 47 (one at each combustion chamber).

Water injection system 60 may include a water storage tank 63, a water lift pump 62, a collection system 72, and a water filling passage 69. Water stored in water tank 63 is delivered to water injectors 45-48 via water passage 61 and conduits or lines 161. In embodiments that include multiple injectors, water passage 61 may contain a valve 162 (e.g., diverter valve, multi-way valve, proportioning valve, etc.) to direct water to the different water injectors via the corresponding conduits. Alternatively, each conduit (or water line) 161 may include respective valves within the water injectors 45-48, for adjusting water flow there-through. In addition to water lift pump 62, one or more additional pumps may be provided in conduits 161 for pressurizing the water directed to the injectors, such as in the conduit coupled to direct water injector 47.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator and/or used to adjust engine operation. For example, a water gauge or indication on a vehicle instrument panel (not shown) may be used to communicate the level of water. If the level of water in the water tank 63 is higher than a threshold level, it may be inferred that there is sufficient water available for injection, and accordingly water injection may be enabled by the controller. Else, if the level of water in the water tank 63 is lower than the threshold level, it may be inferred that there is insufficient water available for injection, and therefore water injection may be disabled by the controller.

In the depicted embodiment, water storage tank 63 may be manually refilled via water filling passage 69 and/or refilled automatically by the collection system 72 via water tank filling passage 76. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface to collect rain or atmospheric condensation. Manual filling passage 69 may be fluidically coupled to a filter 68, which may remove some impurities contained in the water. A drain 92 including a drain valve 91 may be used to drain water from the water storage tank 63 to a location outside the vehicle (e.g., onto the road), such as when a quality of the water is deemed to be lower than a threshold and not suitable for injection into the engine (e.g., due to high conductivity, high particulate matter content). In one example, the quality of the water may be assessed based on the output of a sensor coupled to water injection system 60, in water line 61. For example, the water quality may be assessed based on the output of a conductivity sensor, a capacitance sensor, optical sensor, turbidity sensor, density sensor, or some other type of water quality sensor. However, such sensors may add to system cost and complexity. As elaborated with reference to FIG. 2, a controller may learn a water injection error following a water injection command based on an amount of water delivered to the engine as compared to the amount of water that is vaporized in the engine. The controller may then assess the water quality as a function of the learned water injection error. In particular, based on the degree of contamination of the water, as well as the nature of contaminants present in the water, the boiling temperature of the injected water may vary, causing a change in the fraction of water that vaporizes. In one example, as the salt or ion content of the water increases, the boiling temperature of the water may rise, resulting in a smaller portion of water evaporating and dispersing into the intake aircharge at a given aircharge temperature. Based on the water quality, water usage may be varied. As an example, water usage may be increased when the water quality is low to expedite water reservoir refilling.

The intake air oxygen level sensor (IAO2) is used herein to check that the amount of injected water meets the expectation. The expectation is defined in the control strategy which requests a certain amount of water to be injected. The MCT sensor measures a change in temperature due to the injection, and the IAO2 sensor checks that the amount of water injected meets the expectation. If after an injection the MCT sensor does not sense the expected drop in temperature, the IAO2 sensor provides additional information as to the quality of the water injection. If the IAO2 sensor measures that the expected amount is not achieved, it could be a sign that there is contamination of the injected water. Specifically, the injector may have sprayed the desired amount of liquid, but this liquid may not be water. Alternatively, the water may be contaminated by some other intrusion in systems that use recollection, such as due to the customer filling the water tank with some other liquid. The IAO2 sensor output may not be able to provide an identity of the liquid, but it does tell the system the %"contamination" of the injection. The comparison between the MCT and the IAO2 sensor outputs also provides feedback to the system. If the IAO2 sensor measures that the expected amount of water injection was achieved, but the MCT sensor's drop in temperature does not meet the expectation, the control system can adapt for future injections, as elaborated at FIG. 2.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include CAC 118 sensors, such as CAC inlet air temperature, ACT sensor 125, exhaust pressure and temperature sensors 80, 82, and pressure sensor 124, CAC outlet air temperature sensor, and MCT sensor 33, intake oxygen sensor 34, knock sensor 183 for determining ignition of end gases and/or water distribution among cylinders, and others. The controller 12 receives signals from the various sensors of FIG. 1 and employs the various actuators of FIG. 1 to adjust engine operation based on the received signals and instructions stored on a memory of the controller. For example, injecting water to the engine may include adjusting a pulse-width of injectors 45-48 to vary an amount of water injected while also adjusting a timing of the water injection and a number of injection pulses. In some examples, the storage medium may be programmed with computer readable data representing instructions executable by the processor for performing the methods described below (e.g., at FIG. 2) as well as other variants that are anticipated but not specifically listed.

In this way, the system of FIG. 1 enables a vehicle system comprising an engine including an intake manifold; a water injection system including a water reservoir, a water injector, and a water collection system; a temperature sensor coupled to the intake manifold for estimating a manifold charge temperature; an oxygen sensor coupled to the intake manifold for estimating an intake oxygen level; and a controller. The controller may be configured with computer readable instructions stored on non-transitory memory for: commanding a water injection amount into the engine responsive to engine operating conditions; estimating a first amount of water released into the engine based on a change in the manifold charge temperature following the commanding; estimating a second amount of water vaporized into the engine based on a change in the intake oxygen level following the commanding; and adjusting a subsequent water injection to the engine based on a difference between the first amount and the second amount. The controller may include further instructions for: during a first engine operating condition, operating the oxygen sensor in a first nominal mode with a reference voltage applied to the sensor maintained; and during a second, different engine operating condition, operating the oxygen sensor in a second variable voltage mode with the reference voltage applied to the sensor modulated, wherein the second amount of water estimated when the oxygen sensor is in the first mode is different from the second amount of water estimated when the oxygen sensor is in the second mode. In one example, the first engine operating condition includes an engine fueling condition and the second engine operating condition includes an engine non-fueling condition. The controller may include further instructions for: estimating an air-fuel ratio of exhaust gas recirculated to the intake manifold when operating the oxygen sensor in the first mode; and estimating an ambient humidity in intake aircharge when operating the oxygen sensor in the second mode. In addition, the controller may include further instructions for: estimating a quality of the water based on the difference between the first amount and the second amount; increasing a frequency of water usage and adjusting an engine operating window where water injection is enabled as the estimated quality decreases, and increasing a degree of purification of the water as the estimated quality increases. For example, the controller may choose to narrow the frequency of water usage if the quality is beneath a certain threshold, but increase the frequency above other thresholds to more rapidly purge the tank of "impure" water.

Figure 2:
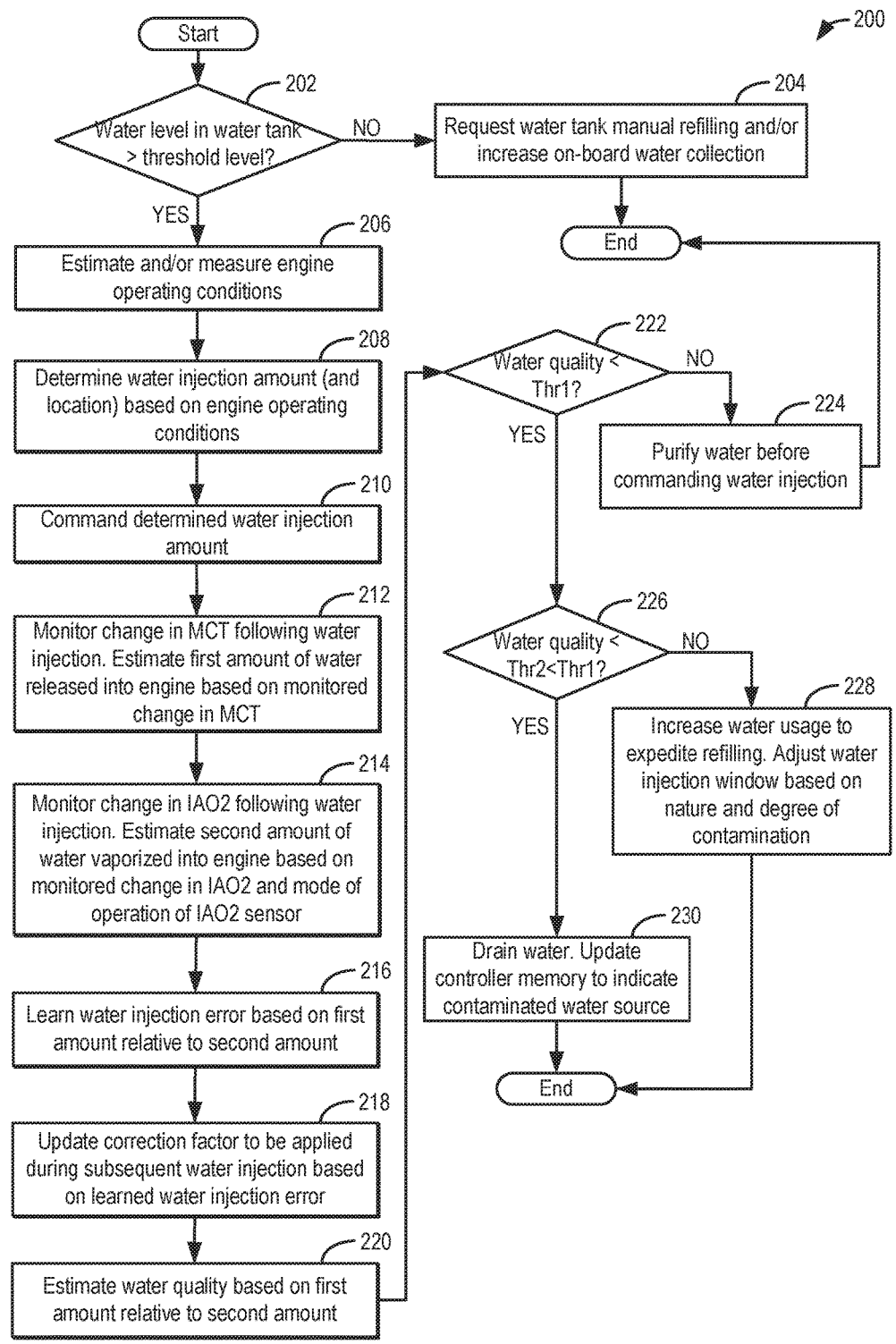
FIG. 2 shows a high level flow chart for learning a water injection error based on one or more engine parameters and estimating a water quality based on the learned water injection error.

Turning now to FIG. 2, an example method 200 is shown for learning a water injection error and correlating the error with the quality of water injected into the engine. The method enables water usage to be varied based on the water quality, reducing damage to engine components from contaminated water. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes determining if the water level in a water tank or reservoir of an engine water injection system is higher than a threshold level, such as above 10% of capacity. The threshold level may reflect a water level above which water injection can be enabled. If not, then at 204, the method includes requesting a manual refilling of the water tank and/or increasing water collection on-board the vehicle. The water injection system may be coupled to an engine of a vehicle, and the water in the reservoir may be refilled manually from a water source off-board the vehicle, such as from a tap or a well. Additionally or alternatively, the reservoir may be refilled on-board the vehicle via a collection system collecting condensate from one or more components, such as an EGR cooler, a charge air cooler, an AC evaporator, an exhaust heat exchanger, and a vehicle external surface. As elaborated with reference to the system of FIG. 1, the water reservoir may be refilled with condensate collected from, as non-limiting examples, water condensed from exhaust passing through an EGR system, and water condensed from air passing through an evaporator of a vehicle air conditioning system.

If the water level is sufficiently high, then at 206, the method includes estimating and/or measuring engine operating conditions. These may include, for example, engine speed, engine load, driver torque demand, engine temperature, ambient conditions (e.g., ambient pressure, temperature, and humidity), boost pressure, MAP, MAF, etc. At 208, based on the estimated engine operating conditions, a water injection amount and location may be determined. The controller may select one or more water injectors from the central, port, and direct water injector for enabling water injection. As one example, water injection into the intake manifold, upstream or downstream of an intake throttle, via a central water injector may be requested to meet an engine dilution demand. As another example, water injection into the intake manifold via the central water injector or the port water injector may be requested for catalyst or exhaust temperature control. As yet another example, water injection into an engine cylinder via a direct water injector may be requested for knock control, wherein the water is injected responsive to an indication of knock (received from a knock sensor). Determining the water injection amount may include determining a number of water injection pulses over which the injection amount is to be delivered, as well as a pulse-width for each water injection. In addition, a timing of the water injection (for example, in relation to cylinder piston position or cylinder valve position) may be determined. At 210, the method includes injecting an amount of water from the water reservoir into the engine. In particular, water injection may be commanded based on the water demand. This includes the controller sending a signal to the selected water injector(s), the signal corresponding to the determined pulse-width of injection at the determined injection timing.

At 212, the method includes monitoring a change in manifold charge temperature (MCT) following the water injection. The controller may then determine a first estimate of the water injection amount (herein also referred to as the first amount or first estimate) based on the monitored change in MCT. The first estimate may be based on an output from a temperature sensor coupled to the engine intake manifold. As such, the first amount may reflect an amount of water released or delivered from the water injector into the engine, and may differ from the amount of water that was commanded to be released from the water injector into the engine.

At 214, the method includes monitoring a change in intake oxygen level (IAO2) following the water injection. The controller may then determine a second estimate of the water injection amount (herein also referred to as the second amount or second estimate) based on the monitored change in IAO2. The second estimate may be based on an output from an oxygen sensor coupled to the engine intake manifold. The second estimate may be further based on a mode of operation of the IAO2 sensor. The sensor may be operated in one of a nominal mode (wherein a reference voltage is applied and maintained) and a variable voltage mode (wherein the reference voltage that is applied is modulated between a higher reference voltage and a lower reference voltage). In one example, the IAO2 sensor may be operated in the nominal mode for EGR estimation (such as during engine fueling conditions), and may be operated in the variable voltage mode for intake humidity estimation (such as during engine non-fueling conditions, for example, during a deceleration fuel shut-off event). The second estimate may be based on a first measured change in the output of the IAO2 sensor when the sensor is operated in the nominal mode at the time of water injection, or based on a second, different measured change in the output of the IAO2 sensor when the sensor is operated in the variable voltage mode at the time of water injection. The IAO2 sensor detects the amount of water by viewing the change in dilution of oxygen in the intake air due to the injected water. Alternatively, a variable reference voltage mode can be used to dissociate the oxygen in the water and take a delta measurement from baseline oxygen in the intake air to the dissociated measurement to detect the amount of water. As such, the second amount may reflect an amount of water vaporized into the engine, and may differ from the amount of water that was delivered from the water injector into the engine. For example, if the water in the reservoir has a high salt or mineral content, the effective boiling temperature of the water solution may be higher than the boiling temperature of pure water. As a result, at a given aircharge temperature, the portion of water that evaporates upon release from the water injector may be lower than the portion that was expected to evaporate and disperse into the engine. For example, the IAO2 sensor may detect less dilution of oxygen if the liquid that was dispersed does not represent "pure water." In the variable voltage (or dissociation) mode, the IAO2 sensor will dissociate less oxygen from the liquid even if the injector released the appropriate amount of liquid by volume.

At 216, the method includes comparing the first estimate of the water injection amount (based on the change in MCT) to the second estimate of the water injection amount (based on the change in IAO2), and learning a water injection error based on the comparing. For example, the controller may estimate a water injection error based on (e.g., as a direct function of) a difference between the first estimate and the second estimate.

In still other examples, the actual change in MCT may be compared to an expected change in MCT, wherein the expected change in MCT is based on the pulse-width of the commanded water injection. The controller may determine if the amount of temperature reduction achieved (as sensed by the MCT sensor) correlates to the expected temperature reduction. Likewise, the actual change in IAO2 level may be compared to an expected change in IAO2 level, wherein the expected change in IAO2 is based on the pulse-width of the commanded water injection and/or the actual change in MCT. For example, if the expected temperature reduction has been met (based on the MCT change) but the IAO2 sensor senses more or less water than expected, future injections may be adapted to compensate for the discrepancy. If the expected temperature reduction has not been met but the IAO2 sensor senses more or less water than expected, then again future injections can be adapted based on the discrepancy. Based on the difference between the actual change in MCT and the expected change in MCT being larger than a threshold, an injection error may be determined. Likewise, based on the difference between the actual change in IAO2 and the expected change in IAO2 being larger than a threshold, an injection error may be determined. For example, if the expected temperature reduction is not met beyond a threshold and the IAO2 sensor does not sense the appropriate amount of water beyond a threshold, then the discrepancy may be associated with contamination of the water.

Learning the water injection error may include learning a percent water deficiency. For example, the water injection error may include an expected percent water deficiency and the water injection amount may be subsequently adjusted to compensate for the deficiency.

At 218, the method includes adjusting a subsequent water injection to the engine based on the comparing. For example, the controller may learn or update a correction factor to be applied to a commanded water injection pulse-width during a subsequent water injection based on the estimated water injection error. The controller may refer a look-up table having the learned water injection error (or the difference between the first and the second estimate) as the input, and having the correction factor to apply to a commanded water injection pulse-width as the output.

It will be appreciated that in addition to adjusting the subsequent water injection to the engine based on the learned water injection error, the controller may also adjust one or more engine operating parameters based on the comparison of the first estimate relative to the second estimate. The adjusting may include, for example, responsive to a further or subsequent indication of knock, retarding spark timing by a larger amount when the difference between the first estimate and the second estimate is larger (that is, when the water injection error is larger), and retarding spark timing by a smaller amount when the difference between the first estimate and the second estimate is smaller (that is, when the water injection error is smaller).

This allows the use of water injection and spark retard for knock control to be better coordinated for improved knock relief. As another example, responsive to a subsequent demand for engine dilution, more EGR may be delivered (by opening the EGR valve to a larger degree) when the water injector error is larger, while less EGR may be delivered (by opening the EGR valve to a smaller degree) when the water injector error is smaller. This allows the use of water injection and EGR for dilution control to be better coordinated without degrading combustion stability.

In some examples, during a subsequent water injection, the water injection amount and the commanded pulse-width of water injection) may be further adjusted based on a comparison of a third estimate of the water injection amount to each of the first and second estimate. Herein the third estimate may be based on a pulse-width of water injection commanded to the water injector during the injecting. A first water injection error reflecting a difference between the amount of water that was commanded to be delivered via a water injector and the amount that was actually delivered via the water injector (and received at the intake manifold, at the outlet of the water injector) may be learned based on the difference between the first estimate and the third estimate. Further, a second water injection error reflecting a difference between the amount of water that was commanded to be delivered via the water injector and the amount that was actually vaporized in the engine (the "useful" amount of water) may be learned based on the difference between the first estimate and the second estimate. This may be used during adaptive control of water injection where the duration of a pulse-width is modified based upon the actual sensed amount of vaporized water in order to more accurately meet the expected amount of water injection.

In one example, the controller may determine an initial control signal to send to the water injector actuator, such as a pulse-width of the signal, based on engine operating conditions including a determination of knock relief or exhaust temperature relief required. The knock relief required may be based on a measured knock sensor output. Likewise, the exhaust temperature relief required may be based on a measured exhaust temperature sensor output or determined based on operating conditions such as engine speed/load and duration of engine operation at the given engine speed/load. The controller may then update the initial pulse-width signal with a correction based on the learned water injection error. The correction factor may be determined through a determination that directly takes into account the learned water injection error, such as increasing the correction factor to increase the pulse-width with increasing water injection error. The controller may alternatively determine the updated pulse width based on a calculation using a look-up table with the input being initial pulse-width and injection error and the output being the updated pulse-width. As another example, the controller may make a logical determination (e.g., regarding a position of an actuator of the water injector) based on logic rules that are a function of the learned injection error. The controller may then generate a control signal that is sent to the water injector actuator.

In one example, the controller may inject water from the water reservoir into an engine intake manifold responsive to an indication of knock or dilution demand. The controller may then feed-forward estimate a water injection error based on a measured change in manifold charge temperature following the injecting. The controller may further feedback adjust the feed-forward estimated water injection error based on a measured change in intake oxygen following the injecting. On a subsequent water injection event, the controller may inject water into the engine as a function of a commanded water injection amount and the feedback adjusted water injection error. For example, the controller may inject water into the engine as a function of the commanded water injection amount and the feedback adjusted water injection error by adjusting an injection pulse width corresponding to the commanded water injection amount with a correction factor based on the feedback adjusted water injection error.

For example, an injection pulse width of a water injector may be adjusted during the injecting of water from the water reservoir into the engine responsive to knock. In one example, if the % water injection error (or % water deficiency) based on the change in MCT relative to the change in IAO2 is determined to be 30%, then during a subsequent water injection event, where 50% water flow is required (e.g., to address knock), the commanded water injection may include 50%+30%=80% water flow. The controller may then generate a control signal that is sent to the water injector actuator.

At 220, the method includes estimating a quality of the water injected into the engine from the water reservoir based on the comparing of the first estimate to the second estimate. Alternatively, the quality of the water (learned as a % water quality with 100% referring to 100%/water) may be determined based on the actual change in MCT relative to the expected change in MCT (also referred to herein as the MCT error) according to equation (1):

$$\text{Water quality} = f(\text{Abs}(\text{actual MCT} - \text{expected MCT}) / \text{actual MCT}) \quad (1)$$

As another example, the quality of the water may be determined based on the actual change in IAO2 relative to the expected change in IAO2 (also referred to herein as the IAO2 error) according to equation (2):

$$\text{Water quality} = f(\text{Abs}(\text{actual IAO2} - \text{expected IAO2}) / \text{actual IAO2}) \quad (2)$$

The % contamination may then be determined based on the % water quality according to equation (3):

$$\text{Contamination} = (1 - \text{water\_quality}) * 100 \quad (3)$$

The controller may refer a look-up table stored in the controller's memory which uses the injection error (or MCT error and/or IAO2 error) as an input and provides an output indicating the estimated water quality. For example, the output may include a degree of change or downgrading of the water quality from an initial level. As an example, a 5% water injection error may correlate with a 5% (or alternate function of 5%) decrease in the water quality. Thus, if the initial water rating was 100% (e.g., water is pure and uncontaminated), then based on the error, the water rating may be downgraded to 95%. In still other examples, the controller may rely on a model that correlates the change in MCT or IAO2 with a change in the water's enthalpy of vaporization, and further correlates the change in the water's enthalpy of vaporization with a change (e.g., decrease) in the water's quality (or contamination level).

The nature of contaminants present in the water in the water reservoir, as well as the degree of contamination may vary widely based on where the vehicle operator refilled the water tank from. As an example, it may be recommended to refill the water tank with distilled water, but the operator may refill with tap water or well water instead. The different sources of water may contain different types and amounts of minerals and other contaminants that may cause the boiling temperature of the resulting water solution to digress from the expected boiling temperature of water. In addition, the contaminants may cause deposits on water filters, water injectors, engine components, exhaust catalysts, etc. The catalysts may also become chemically contaminated. The inventors have recognized that the difference between the amount of water received in the engine and the amount of water vaporized in the engine may be at least in part due to the water quality. As mentioned, based on the degree of contamination of the water, as well as the nature of contaminants present in the water, the boiling temperature of the injected water may vary, causing a change in the fraction of water that vaporizes. In one example, as the salt or ion content of the water increases, the boiling temperature of the water may rise, resulting in a smaller portion of water evaporating and dispersing into the intake aircharge at a given aircharge temperature. Indicating the water quality based on the comparing may include indicating a higher quality of the water when the difference between the first estimate and the second estimate is lower than a threshold. Further, the indicating may include indicating a lower quality of the water when the difference between the first estimate and the second estimate is higher than a threshold. Thus, water of a higher purity level may be inferred when the learned water injection error is smaller, and water of a lower purity level may be inferred when the learned water injection error is larger.

In some examples, the threshold for assessing the water quality may be selected based on a refilling location and/or water source, as well as a history of water quality from that water source. For example, the threshold may be adjusted based on the water refilling location using knowledge of the vehicle's location (such as based on GPS data, location of nearby WiFi hotspots, etc.) combined with knowledge of the local water quality at that location (such as determined on-board or retrieved from a database, such as an internet database of water quality for city water systems and ground water). The controller may additionally refine the threshold with previous history of contamination detected after refilling at the same location (as elaborated below). The history may be based on data collected on-board the given vehicle, or collected on-board an alternate vehicle and retrieved through vehicle-to-vehicle (V2V) or vehicle-to-infrastructure communication. In one example, the quality of the water may be given an index value, or a rating number.

At 222, the estimated water quality (e.g., the index value or rating number assigned to the water) is compared to a first threshold water quality. The first threshold water quality may correspond to an upper threshold water quality level above which water injection into the engine may always be enabled without compromising engine performance or combustion characteristics. If the water quality is above the first threshold quality, then at 224, the method includes, optionally, purifying the water before injecting the water in response to the higher quality of the water. Purifying the water may include one or more of filtration (including filtering the water to remove particulate content), distillation, reverse osmosis, and ion-exchange. Distillation on-board the vehicle can generate a purified water stream using waste heat from the engine and/or the exhaust. Reverse osmosis may include one of a variety of membrane-based methods. Ion exchange may be used with a fixed bed that can either swap between different dissolved materials such as calcium and magnesium exchanged for sodium, or that can exchange the mentioned ions for ions that comprise water ($H^+$ and $OH^-$).

In some examples, a degree of purification, as well as a type of purification may be selected based on the estimated water quality. In particular, sufficient purification may be provided to reduce the deposit issues, while avoiding excessive purification which would increase the parasitic losses (e.g., energy required to evaporate water for distillation or pump water through a filter) and financial costs (e.g., cost of replacement filters or ion exchange bed), and what would decrease customer satisfaction (due to the added hassle and cost of system service). A degree of purification may be selected as a function of the amount/proportion of water that is bypassed around the purification system to the engine, or as a function of how much time the water spends in the purification system. For example, as the amount of water that is bypassed increases, or as the amount of time spent in the purification system increases, the degree of purification may be correspondingly increased.

If the water quality is below the first threshold water quality, then at 226, the method includes comparing the water quality to a second threshold water quality, lower than the first threshold water quality. The second threshold water quality may correspond to a lower threshold water quality level (or minimum water quality level) below which water injection into the engine may always be disabled so as not to compromise engine performance or combustion characteristics. If the water quality is below the second threshold water quality, then at 230, the method includes draining the water from the water reservoir in response to the lower quality of the water. Further, if the water was refilled from a water source off-board the vehicle, responsive to the indicated quality of water being lower than the second threshold water quality, the controller may indicate that the water source is contaminated and disable future refilling of the water reservoir from the water source.

If the water quality is in between the first and the second threshold water quality, at 228, the method includes increasing usage of the water in an engine operating window determined based on the indicated water quality. By increasing water usage, water reservoir refilling may be expedited. In addition, an engine operating window where water injection is permissible may be limited or varied based on the nature and/or degree of contamination. In particular, a water injection window may be selected that better tolerates the level and nature of impurities in the water.

In one example, the controller may widen the engine operating window where water injection is permissible as the estimated water quality decreases from the first threshold water quality towards the second threshold water quality. The controller may selectively widen the window during conditions where it is advantageous to purge the stored amount of water if it is detected that the quality is decreasing. However, if the quality has degraded beyond a defined threshold (e.g., a minimum threshold), the window may be narrowed to prevent injection of a potentially harmful or unknown liquid. In addition, a rate of widening or narrowing the window may be adjusted based on the drop in water quality. For example, the rate of window adjustment may correlate with the rate of change in the water quality. A faster rate of decrease in the estimated water quality may be correlated to a faster narrowing of the window, for example. As an example, when the water quality is 80% degraded (or only 20% pure), the engine operating window for water injection may be widened to try to purge the contaminated liquid. In comparison, when the water quality is 60% degraded (or 40% pure), the window may be narrowed to reduce the adverse effects of the injection of contaminated water. As another example, the engine operating window for water injection may be narrowed as the estimated quality decreases towards a first threshold, and then after the estimated quality reaches the first threshold, the engine operating window for water injection may be widened as the estimated quality decreases towards a second threshold, lower than the first threshold. Then, after the estimated quality reaches the second threshold, water injection may be disabled, the remaining water in the reservoir may be drained, and further water injection may not be enabled until the water reservoir has been refilled.

In another example, the window may be widened or narrowed at a faster rate as the change in water quality increases (that is, as the water quality drops further from an initially expected water quality). In some examples, water injection may be initiated in operating windows where water injection would otherwise not have been used (assuming combustion stability is not affected) to expedite water tank refilling. Then, when the estimated quality falls below the second threshold water quality, the remaining water in the water reservoir may be drained and water injection may be disabled until the reservoir is refilled.

Thus, the controller may compare the measured change in manifold charge temperature following the injecting to the measured change in intake oxygen following the injecting, and estimate a quality of the water in the water reservoir based on the comparing. The controller may then adjust one or more of water injection usage and an engine operating window for water injection based on the estimated quality.

In this way, water injection errors may be learned and compensated for. In addition, a water quality may be inferred from the water injection error using existing engine hardware.

Figure 3:
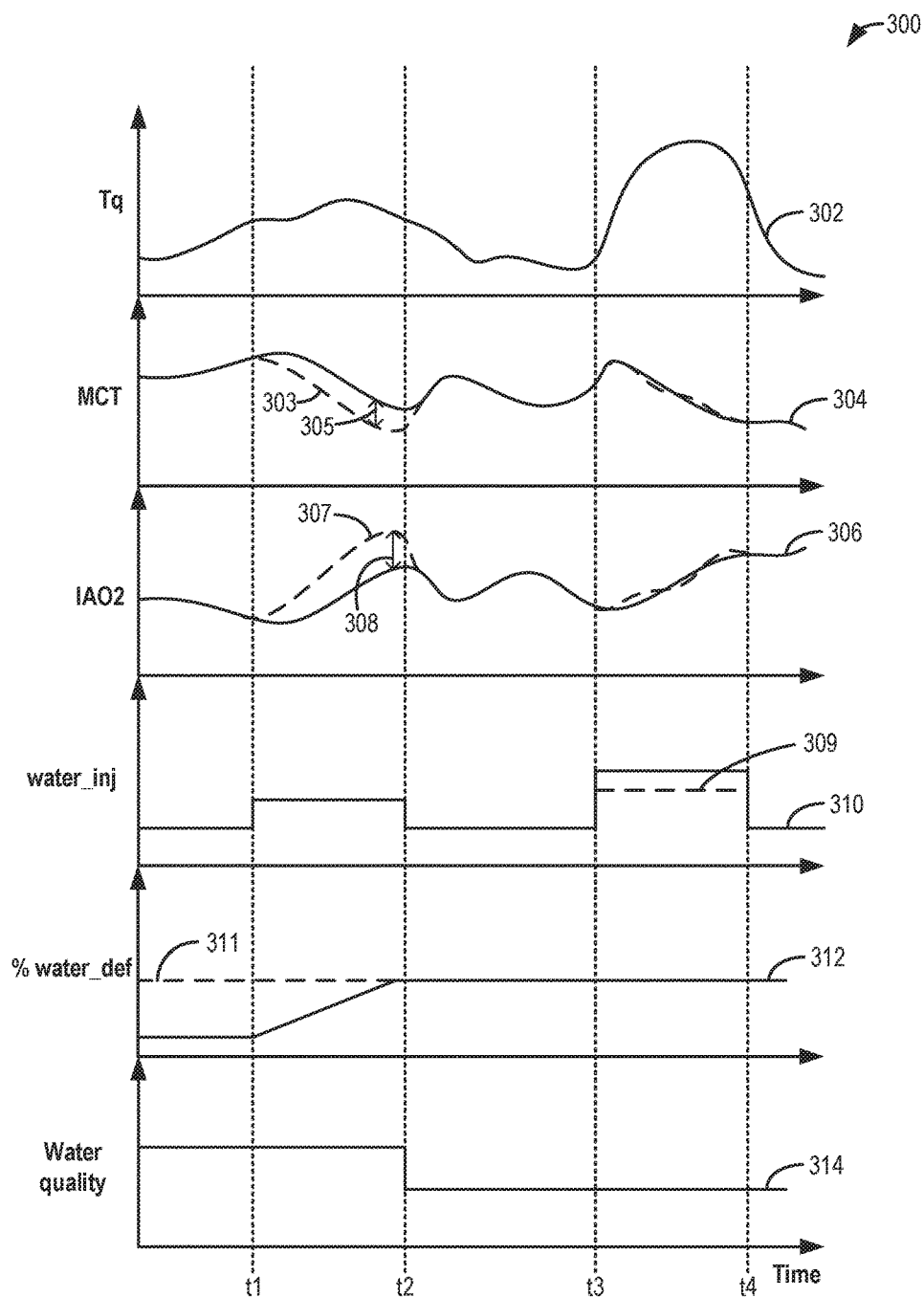
FIG. 3 shows an example water quality assessment and water injection adjustment, according to the present disclosure.

Turning now to FIG. 3, an example learning of a water quality based on a measured water injection error, and a subsequent water injection adjustment is shown. Map 300 depicts engine torque output at plot 302, measured MCT at plot 304 (solid line), expected MCT at plot 303 (dashed line), measured intake air oxygen level (IAO2) at plot 306 (solid line), expected IAO2 at plot 307 (dashed line), engine water injection at plot 310, engine water deficiency at plot 312, and estimated water quality at plot 314. All plots are depicted over time of engine operation along the x-axis.

Prior to t1, the engine may be operating with a lower engine torque output (including low engine speed and load region) due to a lower driver demand. As a result, prior to t1, the engine may be operating with no water injection. At t1, responsive to an increase in torque demand, the engine may be operated with a higher engine torque output (including mid-engine speed and load region). In this operating region, water injection may be required to meet the engine dilution demand. Accordingly, at t1, water injection is enabled and an amount of water required to meet the dilution demand is commanded to be delivered.

Between t1 and t2, while water is injected, a change in MCT and a change in IAO2 are observed. MCT drops with water injection due to the charge cooling effect of the injection. IAO2 increases with water injection due to the dilution effect of the injection. In the depicted example, the actual drop in MCT (solid line, plot 304) is less than the expected drop in MCT (dashed line, plot 303), the expected drop based on the commanded water injection. Accordingly, an MCT error 305 is learned based on the difference between the actual drop in MCT relative to the expected drop in MCT. Also, the actual rise in IAO2 (solid line, plot 306) is less than the expected rise in IAO2 (dashed line, plot 307), the expected rise also based on the commanded water injection. Accordingly, an IAO2 error 308 is learned based on the difference between the actual drop in IAO2 relative to the expected drop in IAO2. Herein the MCT error is attributed to a portion of the commanded water amount not being delivered into the engine, while the IAO2 error is attributed to a portion of the commanded water amount not being vaporized in the engine. Further, both the MCT error and the IAO2 error are attributed to issues with a quality of the water being injected.

At t2, based on the MCT error 305 relative to the IAO2 error 308, a % water deficiency (or injection error) is determined. In the depicted example, a % water deficiency level 311 is learned and saved in the controller's memory. In one example, based on the MCT error relative to the IAO2 following the commanding of a water injection, a 30% water deficiency may be determined. In addition, based on the MCT error 305 relative to the IAO2 error 308, the estimated quality of the injected water is downgraded to indicate that the water quality is lower.

Between t2 and t3, the engine operates in speed-load regions where water injection is not required and water injection is maintained disabled. At t3, responsive to an increase in driver torque demand and a corresponding increase in engine output torque, water injection is commanded. As an example, an amount of water is injected into the engine taking into account the amount of water required for knock relief and exhaust catalyst temperature control at the given operating conditions. Further, the amount of water injected is adjusted based on the learned percent water deficiency. In particular, water injection is provided at a higher than level 309 that would have been applied if the water deficiency was at 0%. With reference to the earlier mentioned example, where a 30% water deficiency was determined, the water injection is provided at a level that is 30% higher than the water level that would have been applied if the water deficiency was 0%.

In addition, responsive to the indication of a lower water quality, water usage may be increased. For example, water injection may be used in mid-speed/load regions (such as the regions operated in between t2 and t3) where water injection would otherwise not have been used. By adjusting the operating window for water injection, water refilling (with higher quality water) may be expedited.

In this way, changes in a manifold charge temperature and an intake oxygen level following a water injection can be correlated with the quality of the injected water. By relying on deviations in the charge cooling effect of the injected water, as well as deviations in the humidity effect of the injected water, the portion of the water injection that was splashed into the engine may be more reliably differentiated from the portion of the water injection that actually vaporized into the engine. In addition, the deviations may be advantageously used to assess the quality of the injected water. As a result, the need for dedicated water quality sensors is reduced without compromising on the reliability of the water quality assessment. By adjusting water usage and engine operation based on the assessed water quality, engine hardware damage from contaminated water may be reduced while continuing to achieve the fuel economy benefits of a water injection.

One example method comprises: injecting an amount of water from a water reservoir into an engine, comparing a first estimate of the water injection amount based on a change in manifold charge temperature to a second estimate of the water injection amount based on a change in intake oxygen level; and adjusting a subsequent water injection to the engine based on the comparing. In the preceding example, additionally or optionally, the water is injected into the engine responsive to an indication of knock, and wherein the water is injected into an intake manifold, upstream or downstream of an intake throttle via a water injector. In any or all of the preceding examples, additionally or optionally, the first estimate is based on an output from a temperature sensor coupled to the intake manifold, and wherein the second estimate is based on the output from an oxygen sensor coupled to the intake manifold. In any or all of the preceding examples, additionally or optionally, the second estimate is further based on a mode of operation of the oxygen sensor, the oxygen sensor operated in one of a nominal mode and a variable voltage mode. In any or all of the preceding examples, additionally or optionally, the adjusting includes: estimating a water injection error based on a difference between the first estimate and the second estimate; and adjusting an injection pulse width of the water injector during the subsequent water injection with a correction factor based on the estimated water injection error. In any or all of the preceding examples, additionally or optionally, the method further comprises adjusting one or more engine operating parameters based on the comparing, the adjusting including, responsive to an indication of knock, retarding spark timing by a larger amount when the difference between the first estimate and the second estimate is larger, and retarding spark timing by a smaller amount when the difference between the first estimate and the second estimate is smaller. In any or all of the preceding examples, additionally or optionally, the method further comprises indicating a quality of the water in the water reservoir based on the comparing, the indicating including: indicating a higher quality of the water when the difference between the first estimate and the second estimate is lower than a threshold; and indicating a lower quality of the water when the difference between the first estimate and the second estimate is higher than a threshold, the threshold selected based on a refilling location and/or water source. In any or all of the preceding examples, additionally or optionally, the method further comprises, in response to the higher quality of the water, purifying the water before injecting the water; and in response to the lower quality of the water, draining the water from the water reservoir or increasing usage of the water in an engine operating window determined based on the indicated quality. In any or all of the preceding examples, additionally or optionally, the method further comprises, responsive to the indicated quality of water being lower than a threshold water quality, wherein the water was refilled from a water source off-board the vehicle, indicating that the water source is contaminated and disabling future refilling of the water reservoir at the water source. In any or all of the preceding examples, additionally or optionally, the method further comprises further adjusting the subsequent water injection based on a comparison of a third estimate of the water injection amount to each of the first and second estimate, the third estimate based on a pulse width commanded to the water injector during the injecting.

Another example method comprises: injecting water from a water reservoir into an engine intake manifold responsive to knock; feed-forward estimating a water injection error based on a measured change in manifold charge temperature following the injecting; feedback adjusting the feed-forward estimated water injection error based on a measured change in intake oxygen following the injecting; and injecting water into the engine as a function of a commanded water injection amount and the feedback adjusted water injection error. In the preceding example, additionally or optionally, the method further comprises comparing the measured change in manifold charge temperature following the injecting to the measured change in intake oxygen following the injecting; estimating a quality of the water in the water reservoir based on the comparing; and adjusting one or more of water injection usage and an engine operating window for water injection based on the estimated quality. In any or all of the preceding examples, additionally or optionally, the adjusting includes increasing water injection usage and widening or narrowing the engine operating window as the estimated quality decreases towards a threshold, and when the estimated quality falls below the threshold, draining the water from the water reservoir. In any or all of the preceding examples, additionally or optionally, the measured change in intake oxygen is estimated by an intake manifold oxygen sensor, and wherein the measured change includes a first measured change when the intake manifold oxygen sensor is operated in nominal mode for EGR estimation, and a second measured change when the intake manifold oxygen sensor is operated in a variable voltage mode for intake humidity estimation. In any or all of the preceding examples, additionally or optionally, the engine is coupled in a vehicle, and wherein the water in the reservoir is refilled manually from a water source off-board the vehicle or refilled on-board the vehicle via a collection system, the collection system collecting condensate from one or more of an EGR cooler, a charge air cooler, an AC evaporator, an exhaust heat exchanger, and a vehicle external surface. In any or all of the preceding examples, additionally or optionally, the injecting water into the engine as a function of the commanded water injection amount and the feedback adjusted water injection error includes adjusting an injection pulse width corresponding to the commanded water injection amount with a correction factor based on the feedback adjusted water injection error.

Another example vehicle system comprises an engine including an intake manifold; a water injection system including a water reservoir, a water injector, and a water collection system; a temperature sensor coupled to the intake manifold for estimating a manifold charge temperature; an oxygen sensor coupled to the intake manifold for estimating an intake oxygen level; and a controller with computer readable instructions stored on non-transitory memory for: commanding a water injection amount into the engine responsive to engine operating conditions; estimating a first amount of water released into the engine based on a change in the manifold charge temperature following the commanding; estimating a second amount of water vaporized into the engine based on a change in the intake oxygen level following the commanding; and adjusting a subsequent water injection to the engine based on a difference between the first amount and the second amount. In the preceding example, additionally or optionally, the controller includes further instructions for, during a first engine operating condition, operating the oxygen sensor in a first nominal mode with a reference voltage applied to the sensor maintained; and during a second, different engine operating condition, operating the oxygen sensor in a second variable voltage mode with the reference voltage applied to the sensor modulated, wherein the second amount of water estimated when the oxygen sensor is in the first mode is different from the second amount of water estimated when the oxygen sensor is in the second mode. In any or all of the preceding examples, additionally or optionally, the first engine operating condition includes an engine fueling condition and the second engine operating condition includes an engine non-fueling condition, and wherein the controller includes further instructions for estimating an air-fuel ratio of exhaust gas recirculated to the intake manifold when operating the oxygen sensor in the first mode; and estimating an ambient humidity in intake aircharge when operating the oxygen sensor in the second mode. In any or all of the preceding examples, additionally or optionally, the controller includes further instructions for estimating a quality of the water based on the difference between the first amount and the second amount; increasing a frequency of water usage and narrowing an engine operating window where water injection is enabled as the estimated quality decreases to a threshold, and thereafter widening the engine operating window as the estimated quality decreases below the threshold; and increasing a degree of purification of the water as the estimated quality increases.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
injecting an amount of water from a water reservoir into an engine;
comparing a first estimate of the water injection amount based on a change in manifold charge temperature to a second estimate of the water injection amount based on a change in intake oxygen level; and
adjusting a subsequent water injection to the engine based on the comparing.

2. The method of claim 1, wherein water is injected into the engine responsive to an indication of knock, and wherein the water is injected into an intake manifold, upstream or downstream of an intake throttle via a water injector.

3. The method of claim 2, wherein the adjusting includes:
estimating a water injection error based on a difference between the first estimate and the second estimate; and
adjusting an injection pulse width of the water injector during the subsequent water injection with a correction factor based on the water injection error.

4. The method of claim 3, further comprising, adjusting one or more engine operating parameters based on the comparing, the adjusting including, responsive to an indication of knock, retarding spark timing by a larger amount when the difference between the first estimate and the second estimate is larger, and retarding spark timing by a smaller amount when the difference between the first estimate and the second estimate is smaller.

5. The method of claim 3, further comprising, indicating a quality of the water in the water reservoir based on the comparing, the indicating including:
indicating a higher quality of the water when the difference between the first estimate and the second estimate is lower than a threshold; and
indicating a lower quality of the water when the difference between the first estimate and the second estimate is higher than a threshold, the threshold selected based on a refilling location and/or water source.

6. The method of claim 5, further comprising:
in response to the higher quality of the water, purifying the water before injecting the water; and
in response to the lower quality of the water, draining the water from the water reservoir or increasing usage of the water in an engine operating window determined based on an indicated quality of the water.

7. The method of claim 6, further comprising, responsive to the indicated quality of water being lower than a threshold water quality, wherein the water was refilled from a water source off-board the vehicle, indicating that the water source is contaminated and disabling future refilling of the water reservoir at the water source.

8. The method of claim 2, further comprising, further adjusting the subsequent water injection based on a comparison of a third estimate of the water injection amount to each of the first and second estimate, the third estimate based on a pulse width commanded to the water injector during the injecting.

9. The method of claim 1, wherein the first estimate is based on an output from a temperature sensor coupled to the intake manifold, and wherein the second estimate is based on the output from an oxygen sensor coupled to the intake manifold.

10. The method of claim 9, wherein the second estimate is further based on a mode of operation of the oxygen sensor, the oxygen sensor operated in one of a nominal mode and a variable voltage mode.

11. An engine method, comprising:
injecting water from a water reservoir into an engine intake manifold responsive to knock;
feed-forward estimating a water injection error based on a measured change in manifold charge temperature following the injecting;

feedback adjusting the feed-forward estimated water injection error based on a measured change in intake oxygen following the injecting; and injecting water into the engine as a function of a commanded water injection amount and the feedback adjusted water injection error.

12. The method of claim 11, further comprising, comparing the measured change in manifold charge temperature following the injecting to the measured change in intake oxygen following the injecting;

estimating a quality of the water in the water reservoir based on the comparing; and adjusting one or more of water injection usage and an engine operating window for water injection based on the estimated quality.

13. The method of claim 12, wherein the adjusting includes increasing water injection usage and narrowing the engine operating window as the estimated quality decreases towards a threshold, and when the estimated quality falls below the threshold, draining the water from the water reservoir.

14. The method of claim 11, wherein the measured change in intake oxygen is estimated by an intake manifold oxygen sensor, and wherein the measured change includes a first measured change when the intake manifold oxygen sensor is operated in nominal mode for EGR estimation, and a second measured change when the intake manifold oxygen sensor is operated in a variable voltage mode for intake humidity estimation.

15. The method of claim 11, wherein the engine is coupled in a vehicle, and wherein the water in the reservoir is refilled manually from a water source off-board the vehicle or refilled on-board the vehicle via a collection system, the collection system collecting condensate from one or more of an EGR cooler, a charge air cooler, an AC evaporator, an exhaust heat exchanger, and a vehicle external surface.

16. The method of claim 11, wherein the injecting water into the engine as a function of the commanded water injection amount and the feedback adjusted water injection error includes adjusting an injection pulse width corresponding to the commanded water injection amount with a correction factor based on the feedback adjusted water injection error.

17. A vehicle system, comprising:

an engine including an intake manifold;

a water injection system including a water reservoir, a water injector, and a water collection system;

a temperature sensor coupled to the intake manifold for estimating a manifold charge temperature;

an oxygen sensor coupled to the intake manifold for estimating an intake oxygen level; and a controller with computer readable instructions stored on non-transitory memory for:

commanding a water injection amount into the engine responsive to engine operating conditions;

estimating a first amount of water released into the engine based on a change in the manifold charge temperature following the commanding;

estimating a second amount of water vaporized into the engine based on a change in the intake oxygen level following the commanding; and adjusting a subsequent water injection to the engine based on a difference between the first amount and the second amount.

18. The system of claim 17, wherein the controller includes further instructions for:

during a first engine operating condition, operating the oxygen sensor in a first nominal mode with a reference voltage applied to the sensor maintained; and during a second, different engine operating condition, operating the oxygen sensor in a second variable voltage mode with the reference voltage applied to the sensor modulated, wherein the second amount of water estimated when the oxygen sensor is in the first mode is different from the second amount of water estimated when the oxygen sensor is in the second mode.

19. The system of claim 18, wherein the first engine operating condition includes an engine fueling condition and the second engine operating condition includes an engine non-fueling condition, and wherein the controller includes further instructions for:

estimating an air-fuel ratio of exhaust gas recirculated to the intake manifold when operating the oxygen sensor in the first mode; and estimating an ambient humidity in intake aircharge when operating the oxygen sensor in the second mode.

20. The system of claim 17, wherein the controller includes further instructions for:

estimating a quality of the water based on the difference between the first amount and the second amount;

increasing a frequency of water usage and narrowing an engine operating window where water injection is enabled as the estimated quality decreases to a threshold, and thereafter widening the engine operating window as the estimated quality decreases below the threshold; and increasing a degree of purification of the water as the estimated quality increases.

* * * * *